(12) United States Patent (10) Patent No.: US 8,612,042 B2
Pettus et al. (45) Date of Patent: Dec. 17, 2013

(54) ONLINE RECIPE SYNCHRONIZATION IN A REAL-TIME BATCH EXECUTIVE ENVIRONMENT

(71) Applicant: Fisher-Rosemount Systems, Inc., Round Rock, TX (US)

(72) Inventors: Nathan W. Pettus, Georgetown, TX (US); Godfrey R. Sherriff, Austin, TX (US); Aaron C. Jones, Round Rock, TX (US); Dawn Marruchella, Austin, TX (US)

(73) Assignee: Fisher-Rosemount Systems, Inc., Round Rock, TX (US)

( * ) Notice: Subject to any disclaimer, the term of this patent is extended or adjusted under 35 U.S.C. 154(b) by 0 days.

(21) Appl. No.: 13/757,503

(22) Filed: Feb. 1, 2013

(65) Prior Publication Data
US 2013/0150995 A1 Jun. 13, 2013

Related U.S. Application Data

(62) Division of application No. 12/234,117, filed on Sep. 19, 2008, now Pat. No. 8,369,975.

(60) Provisional application No. 60/974,368, filed on Sep. 21, 2007.

(51) Int. Cl.
*G06F 19/00* (2011.01)
(52) U.S. Cl.
USPC ............................. 700/105; 700/87; 715/965
(58) Field of Classification Search
None
See application file for complete search history.

(56) References Cited

U.S. PATENT DOCUMENTS

| 4,786,182 A | 11/1988 | Larsen |
| 5,576,946 A | 11/1996 | Bender et al. |
| 6,289,252 B1 | 9/2001 | Wilson et al. |
| 6,385,496 B1 | 5/2002 | Irwin et al. |
| 6,732,006 B2 * | 5/2004 | Haanstra et al. .............. 700/121 |
| 6,871,299 B2 | 3/2005 | Havekost et al. |
| 7,369,912 B2 | 5/2008 | Sherriff et al. |

(Continued)

FOREIGN PATENT DOCUMENTS

| EP | 1 833 077 | 9/2007 |
| JP | 08-087421 A | 4/1996 |
| JP | 2002-312028 A | 10/2002 |
| WO | WO-2005/058717 A1 | 6/2005 |

OTHER PUBLICATIONS

Cybulski et al., "Fine Chemicals Manufacture: Technology and Engineering," (2001).
European Examination Report for Application No. 08164767.9, dated Nov. 17, 2010.
European Search Report for Application No. 08164767, dated Jul. 13, 2009.

(Continued)

*Primary Examiner* — Sean Shechtman
(74) *Attorney, Agent, or Firm* — Marshall, Gerstein & Borun LLP

(57) ABSTRACT

A method of executing a batch process in a manufacturing environment according to a product recipe, such that the product recipe specifies a plurality of actions and a plurality of parameters, includes performing at least one action of the batch process corresponding to a first version of the product recipe, receiving a second version of the product recipe, such that the second version of the product recipe is distinct from the first version of the product recipe, suspending the execution of the batch process prior to completion of the batch process, and resuming the execution of the batch process according to the second version of the product recipe.

7 Claims, 10 Drawing Sheets

(56) References Cited

U.S. PATENT DOCUMENTS

| | | |
|---|---|---|
| 8,369,975 B2 | 2/2013 | Pettus et al. |
| 2002/0076689 A1 | 6/2002 | Farb et al. |
| 2002/0182870 A1* | 12/2002 | Matsunaga et al. ........... 438/700 |
| 2004/0181294 A1 | 9/2004 | Deitz et al. |
| 2004/0225384 A1 | 11/2004 | Onishi et al. |
| 2007/0156272 A1* | 7/2007 | Winstead et al. ............... 700/97 |
| 2007/0212846 A1* | 9/2007 | Yokouchi et al. ............. 438/402 |

OTHER PUBLICATIONS

Examination Report for GB0817303.1 dated Jan. 31, 2012.
Extended European Search Report for Application No. 12188129.6, dated Dec. 21, 2012.
Office Action for Japanese Application No. 2008-242687, dated Jan. 8, 2013.
Search Report for Application No. GB0817303.1, dated Dec. 12, 2008.

* cited by examiner

ONLINE RECIPE SYNCHRONIZATION IN A REAL-TIME BATCH EXECUTIVE ENVIRONMENT

CROSS REFERENCE TO RELATED APPLICATIONS

This application is a divisional application of and claims the benefit of priority to U.S. application Ser. No. 12/234,117 filed Sep. 19, 2008, entitled "Online Recipe Synchronization in a Real-Time Batch Executive Environment," which claims the benefit of U.S. Provisional Patent App. No. 60/974,368 entitled "Online Recipe Synchronization in a Real-Time Batch Executive Environment," filed Sep. 21, 2007, the disclosures of which are hereby expressly incorporated herein by reference.

FIELD OF TECHNOLOGY

The present invention relates generally to process control networks and, more particularly, to a batch execution engine capable of accepting changes to currently running batches.

DESCRIPTION OF THE RELATED ART

Process control systems, such as those that use batch processing techniques to produce large quantities of pharmaceuticals, chemicals, beverages, paint, or any other product, generally include one or more centralized process controllers communicatively coupled to one or more field devices which may be, for example, valve positioners, switches, sensors (such as temperature, pressure and flow rate sensors), etc. These field devices may be associated with control equipment such as, for example, valves, pumps, mixing units, etc., may perform physical control functions (such as opening or closing a valve, turning a pump or mixing unit on and off, etc.) within a process control system, may take measurements within the process control system for use in controlling the operation of the process or may perform any other desired function within the process control system. Generally speaking, the process controllers receive signals indicative of measurements made by one or more field devices and/or other information pertaining to the field devices, use this information to implement a typically complex control routine and generate control signals that are sent via the signal lines or buses to the field devices to control the operation of the process control system.

Furthermore, the process controllers are generally coupled via a data highway, such as an Ethernet bus, to one or more workstations and other devices. These other devices typically run other applications or programs that use the information provided by the one or more controllers to provide other process control functions, such as providing a user interface to the control routine, enabling modification or updating of the control routine, interfacing with the field devices, storing historical process control data, controlling or restricting user access, etc. In some large process control systems, one or more workstations located at a remote site may be coupled to the data highway via a further communication network, such as an Internet connection, a satellite or cellular communication link, a radio link (as used in wireless Ethernet connections), etc.

Process control systems that produce batches of products typically include a graphical interface, which enables a user (e.g., an engineer) to define and store one or more basic product recipes, batch parameters, equipment lists, etc. These basic product recipes typically include a sequence of process steps that are each associated with or bound to a particular equipment list. In binding recipe process steps to particular pieces of equipment, the user (e.g., an operator) explicitly defines, prior to the batch execution of the recipe, which piece of process control equipment to be used to carry out each process step of the recipe. Additionally, each of the process steps may require a user (e.g., an operator) to define one or more input/output (I/O) batch parameter values that are used during the execution of a batch to control the sequence and/or timing of equipment operations, set alarm limits, set target control values (e.g., setpoints), etc. These I/O parameter values may be associated with inputs and outputs that are sent to or which are received from one or more of the field devices within the process control system or, alternatively, may be intermediate or calculated values that are generated by the process control system during the execution of a batch. Thus, in defining a batch, a user (e.g., an operator) typically uses the graphical interface to select a basic product recipe (which includes specifications that bind the process steps of the recipe to process control equipment) and to specify the parameter values that are to be used during execution of the batch. For example, in a control system that produces batches of paint, a user (e.g., an operator) may interact with the graphical interface to select a basic paint recipe such as, for example, a semi-gloss exterior latex paint, and may specify parameter values that result in the production of a batch of 100 gallons of a particular color of semi-gloss exterior latex paint.

By way of example only, a basic paint recipe may include one or more process steps that add colorants or other substances to a basic paint mixture and may further include additional process steps that mechanically blend these colorants and other substances into the basic paint mixture. The blending and mixing process steps, or any other process steps associated with the basic paint recipe, may be bound to specific pieces of equipment within the process control system. For example, a first mixing step may be bound to a first blender and a second mixing step may be bound to a second blender or, alternatively, if desired, the second mixing step may instead be bound to the first blender. Similarly, each process step of the recipe that adds colorant to the paint mixture may be bound to a particular piece of colorant dispensing equipment.

Furthermore, in defining a batch, a user may provide a variety of I/O parameter values such as blending times, colorant amounts, etc. that are used by the process control system during execution of the batch to carry out the process steps specified by the batch and to achieve a desired final paint product. A user can thus produce a variety of final paint products including a variety of basic paint types (as specified by basic recipes) in a variety of colors (as specified by I/O parameter values). Of course, because conventional batch definition techniques may also be used to create many other types of products such as pharmaceuticals, beverages, food products, etc., the particular process steps, equipment bound to the process steps and the I/O parameter values may be varied so that the process control system produces the desired final product.

In the recent years, batch execution environments have become significantly more complex. For example, many modern batch process plants run several parallel batches using multiple "equipment trains," or sets of operatively connected control equipment units necessary to physically perform a particular batch run. Recipes have also grown longer, with every procedural step in turn increasing in complexity. Meanwhile, measurement devices now yield better measurements of batch parameters and report these measurements in real-time or in near real-time to controllers and operator workstations. In particular, these measurement devices may quickly and accurately detect such abnormal conditions as, for example, excessive temperature, insufficient pressure, or an unexpectedly high concentration of a particular chemical. Operators understandably wish to respond to these conditions as quickly as possible in order to reduce product loss and to avoid harmful situations. As a result, the industry demands more flexibility from batch execution environments even as the task of controlling batches becomes increasingly more complex.

Moreover, some countries have also experienced changes in government regulation related to certain manufacturing methods. For example, the Food and Drug Administration of the United States (FDA) recently launched the so-called Process Analytic Technology (PAT) initiative. The stated goal of PAT is to control the manufacturing process in addition to final manufactured products. To comply with PAT requirements, manufactures must be able to assure quality at the intermediate steps of a corresponding manufacturing process and, of course, properly and timely respond to the detected conditions. Thus, modern batch execution environments must be flexible for both economic and regulatory reasons.

Unfortunately, the existing batch execution technology and methodology fall short of meeting these demands in a cost-effective manner. A typical process control system servicing a batch process plant maintains recipe information in a dedicated database. For every product, the database stores a "control recipe" which may include a procedural structure of the recipe, recipe parameters, a list of equipment units required by the recipe, and other recipe information. In response to an operator command or other predetermined condition, the process control system retrieves a particular control recipe from the database and applies the recipe to a selected "batch executive," or a subsystem responsible for executing one or more batch runs according to the received recipe. The batch executive saves the snapshot of the received version of the recipe so that changes to the control recipe do not effect the execution of an already running batch. In other words, the batch executive can only execute the originally received recipe and does not react to the potential changes to the control recipe in the database in real time.

Traditionally, operators have found the lifetime association between a batch executive and a single version of a recipe to be acceptable. Until the recent rapid changes in technology and government regulation, plants ran one or more batches with the same recipe for months at a time. Operators applied new recipes relatively infrequently and planned the introduction of new recipes well in advance. However, the current state of the industry demands that batch execution environments become responsive to sudden and frequent changes in recipe even for those batches that take weeks or months to complete.

Some attempts have been made in the recent years to increase the flexibility of batch execution environments. For example, the Emerson Process Management DeltaV™ interface tool allows operators to force transitions between steps of a recipe as part of the Active Step Change feature. While the Force Transition function greatly extends operators' control over the execution of a recipe, this feature does not grant operators control over the actual steps or logic of the recipe. Active Step Change additionally allows operators to initiate a run of a certain phase of a recipe as a standalone batch. However, this aspect of the feature is similarly limited to the original definition of the recipe. Moreover, the manual operation is permitted only on the phase level. Thus, if an engineer or an operator updates a recipe which is already being executed by a batch runner, the current technology does not permit the batch runner to pick up the new version of the recipe until the execution of the original version is completed, even if the execution of the original version has not progressed past the point to which the changes in the recipe apply.

SUMMARY OF THE DISCLOSURE

A batch execution environment operating in a process control system allows a user to synchronize a running batch with a new version of a recipe being executed by the running batch. The user operates the user interface tool to select a batch executing an old version of the recipe, interrupt the execution of the selected batch, and resume the operation of the interrupted batch with an updated version of the recipe. In one embodiment, a batch subsystem receives a new version of a recipe from a user interface tool, saves the new version in a configuration database, and automatically identifies the difference between the new version of the recipe and the version of the same recipe currently running in the batch execution environment. In response to receiving a command from the user interface tool, the batch subsystem automatically synchronizes the batch with the new version of the recipe.

In one aspect, the batch subsystem performs resynchronization on demand. In another aspect, the batch subsystem allows automatic resynchronization triggered by a predefined condition. In yet another aspect, the user can configure the batch subsystem to automatically attempt resynchronization without requesting user's authorization or, by activating a different option via the user interface tool, the user can limit resynchronization to manual intervention only. In this case, the batch subsystem must receive an explicit command from the user prior to synchronization even if the batch subsystem becomes aware of a new recipe version.

In one embodiment, the batch subsystem includes one or more batch runner processes with each batch runner executing exactly one batch, a batch manager process overseeing the operation of each batch runner process, and a batch runtime process detecting changes to recipes. Each batch runner may be configured to execute a different recipe. In one embodiment, each batch runner saves event information, such as transitions between steps, operations, and phases, in a persistent location. The batch manager reports the event information for each of the batch runners to the user interface tool. In another aspect, the batch manager receives commands from the user interface tools and tells batch runners when to start, stop, or hold execution.

In one aspect, a user can make changes to a particular element of an existing recipe without changing the original name of a unit procedure corresponding to the element, thus retaining the original high-level logic of the recipe. In another aspect, a user can use the user interface tool to update the logic of a recipe currently run by a batch runner by changing the operands controlling the selection of conditional steps. For example, the user may wish to change an OR operand to an AND operand or to skip a certain recipe element. In yet another aspect, a user can resynchronize a running batch with a recipe version including additional recipe elements.

In one embodiment, a user specifies one or more valid resynchronization points either during recipe configuration or by accessing an existing recipe at a later time. Each valid resynchronization point is a transition in the original recipe at which the batch can be safely stopped or suspended. As a safety feature, the batch subsystem will prevent the user from re-synchronizing a batch until the batch reaches one of the valid resynchronization points. In another embodiment, the batch subsystem uses the resynchronization points to perform automatic resynchronization. If configured in a corresponding mode, the batch manager automatically suspends a batch runner which has reached a valid resynchronization point and (if the batch runtime process detects a valid recipe change) applies the new version of the recipe to the batch runner.

In one embodiment, the batch subsystem automatically detects new recipe versions, determines the difference between recipe versions, and communicates the information related to the new recipe elements or transition to the user interface tool. In some contemplated embodiments, the batch subsystem parses the name assigned to a recipe recently added to the configuration database to determine whether the new recipe is a new version of an older recipe. The user interface tool the presents a list of recipe elements to the user and visually directs user's attention to the new recipe elements potentially available for synchronization.

In another aspect, the batch subsystem additionally receives synchronization or restart options from the user interface tool after a batch process has been suspended. The synchronization or restart options tell one or more batch runner whether to run the suspended batch process from the beginning (a "cold" restart or synchronize option) or from the previously suspended state (a "warm" restart or synchronize option). Moreover, the synchronization or restart options specify whether the batch process should revert to the previous version of the recipe ("restart") or apply a new version of the recipe ("synchronize").

DETAILED DESCRIPTION

Figure 1:
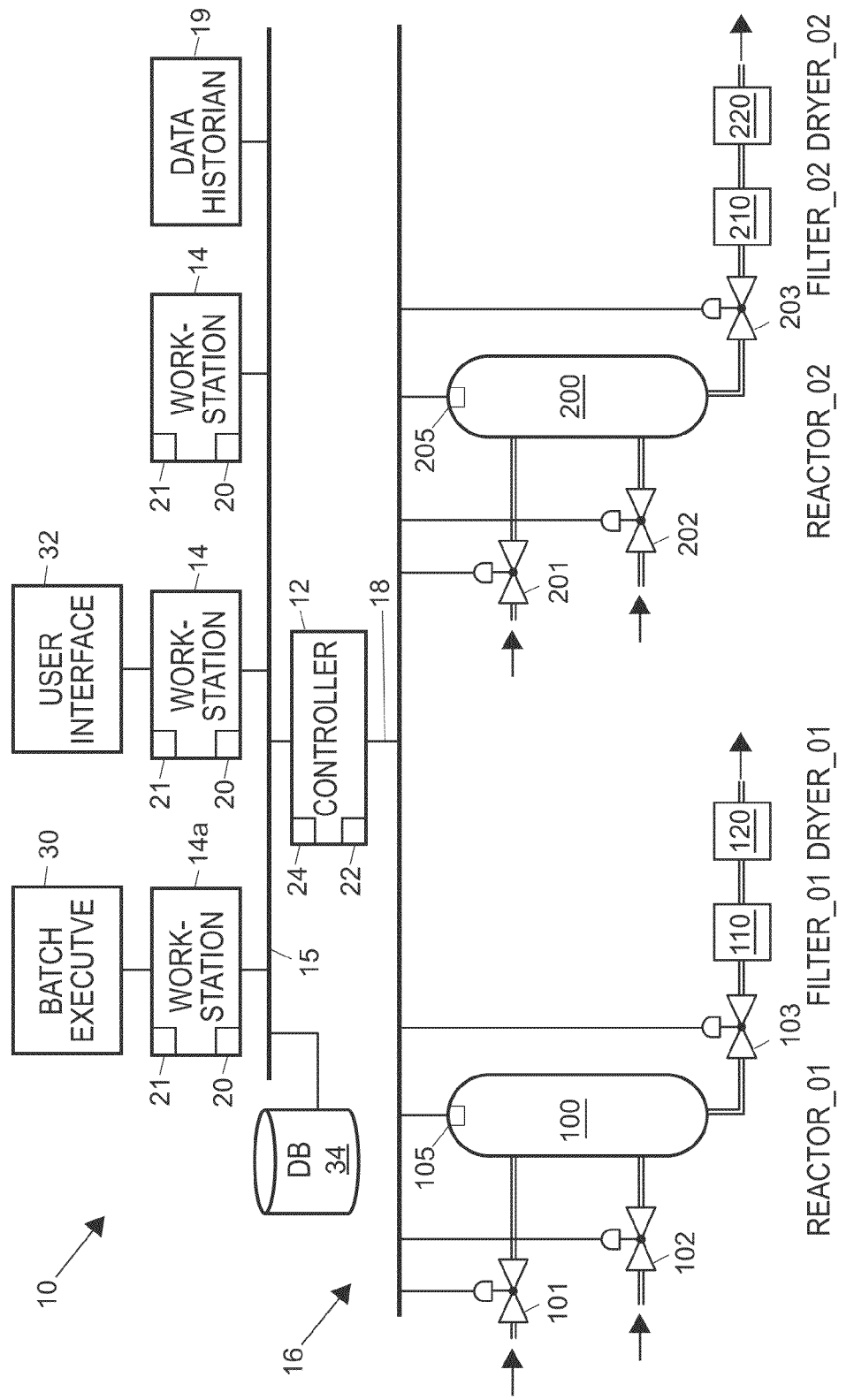
FIG. 1 is a partial block diagram, partial schematic diagram of a portion of a process control network on which a batch execution environment may implement recipe synchronization on demand.

Referring now to FIG. 1, a process plant control network 10 includes a process controller 12 coupled to numerous workstations 14 via, for example, an Ethernet communications connection 15. The controller 12 is also coupled to devices or equipment within a process plant (generally designated by the reference numeral 16) via an input/output (I/O) device (not shown) and a set of communication lines or a bus 18. The controller 12, which may be by way of example only, the DeltaV™ controller sold by Fisher-Rosemount Systems, Inc., is capable of communicating with control elements, such as field devices and function blocks within field devices distributed throughout the process plant 16 to perform one or more process control routines to thereby implement desired control of the process plant 16. These process control routines may be continuous or batch process control routines or procedures. The workstations 14 (which may be, for example, personal computers, servers, etc.) may be used by one or more engineers or operators to design process control routines to be executed by the controller 12, to communicate with the controller 12 so as to download such process control routines, to receive and display information pertaining to the process plant 16 during operation of the process plant 16 and to otherwise interact with the process control routines executed by the controllers 12. Additionally, a data historian 19 may be connected to the LAN 15 and may automatically collect and store data generated within the plant 50, including within the controller 12, the filed devices and even the workstations 14, in any known or desired manner.

Each of the workstations 14 includes a memory 20 for storing applications, such as configuration design applications, and for storing data, such as configuration data pertaining to the configuration of the process plant 16. Each of the workstations 14 also includes a processor 21 that executes the applications to, among other things, enable a user to design process control routines and download those process control routines to the controller 12. Likewise, the controller 12 includes a memory 22 for storing configuration data and process control routines to be used to control the process plant 16 and includes a processor 24 that executes the process control routines to implement a process control strategy. If the controller 12 is a DeltaV controller, it, in conjunction with one or more applications on one of the workstations 14, may provide a graphical depiction of the process control routines within the controller 12 to a user illustrating the control elements within the process control routine and the manner in which these control elements are configured to provide control of the process plant 16.

Generally speaking, the process control system of FIG. 1 may be used to implement batch processes in which, for example, one of the workstations 14 executes a batch executive that implements and coordinates different batch runs within the process plant 16. In the exemplary process control system illustrated in FIG. 1, such a batch executive 30 resides in the workstation 14a. However, the batch executive 30 could be stored and executed in other workstations 14, or in other computers communicatively connected to the bus 15 or the bus 18 in any desired manner, including in any wireless manner. Likewise, as discussed in more detail with respect to FIG. 3, the batch executive 30 may be divided into various components or be associated with various components stored in and executed in different computers or workstations within the process plant 16.

Additionally, it will be appreciated that the process plant control network 10 may include more than one batch executive 30. For example, modern plants currently support up to 4 batch executives sharing some or all of the resources of the process plant control network 10. One or more batch executives 30 may be generally referred to as a batch subsystem. By contrast, a configuration subsystem refers to user interface tools, configuration databases, and other hardware, firmware, and software modules used for defining and editing recipes, monitoring the performance of batch runs, and other administrative purposes. It will be noted that in the present discussion, the terms "batch executive" and "batch subsystem" are used interchangeably.

In operation, a user may operate a batch operator interface ("BOI") 32 to define recipes, create batches executing the recipes, and control batch execution. Specifically with respect to controlling batch execution, the BOI 34 may allow users to start, stop, pause, and update batch runs. The BOI 34 may interact with the batch subsystem 30 via the Ethernet link 15, over a wireless link, or in any other known manner. Although FIG. 1 schematically depicts the BOI 34 as part of the workstation 14, other implementations and arrangements are equally possible. For example, the BOI 34 may also run on the workstation 14a, on a portable device (not shown), or on a host disposed outside the process plant control network 10. Further, there may be several instances of the BOI 34 instantiated on various hosts in the process plant control network 10 simultaneously supporting multiple operators. Still further, it will be appreciated that the process plant control network 10 may provide more than one user interface means for accessing recipe configuration and batch operations. The DeltaV™ system, to take one example, provides user interface through such components as DeltaV Operate and DeltaV Batch Operator Interface, among others.

Referring again to FIG. 1, a configuration database 34 may store the recipes for the batch subsystem 30, equipment data such as a list of equipment units in the plant and equipment hierarchy, administrative information related to various areas of the plant, association of equipment units with plant areas, hierarchical breakdown of equipment, and other configuration data. The configuration database 34 may reside in a configuration subsystem separate from the batch subsystem 30. Also, it will be noted that the configuration database 34 may be a separate server or a group of servers or, if the process plant control network 10 is sufficiently small, the configuration database 34 may be implemented simply as a dedicated process servicing part of the file system of the workstation 14 or 14a.

In the example process plant control network 10 illustrated in FIG. 1, the controller 12 is communicatively connected via the bus 18 to two sets of similarly configured equipment, each set of equipment having a reactor unit referred to herein as Reactor_01 (R1) or Reactor_02 (R2), a filter unit referred to herein as Filter_01 (F1) or Filter_02 (F2) and a dryer unit referred to herein as Dryer_01 (D1) or Dryer_02 (D2). Reactor_01 includes a reactor vessel 100, two input valves 101 and 102 connected so as to control fluid inlet lines providing fluid from, for example, a headtank (not shown) into the reactor vessel 100 and an output valve 103 connected so as to control fluid flow out of the reactor vessel 100 via an outlet fluid line. A device 105, which can be a sensor, such as a temperature sensor, a pressure sensor, a fluid level meter etc. or some other equipment such as an electrical heater or a steam heater, is disposed in or near the reactor vessel 100. The Reactor_01 is coupled via the valve 103 to the Filter_01 having filter equipment 110 which, in turn is coupled to the Dryer_01 having dryer equipment 120. Similarly, the second set of equipment includes the Reactor_02 which has a reactor vessel 200, two input valves 201 and 202, an output valve 203 and a device 205. The Reactor_02 is coupled to the Filter_02 having filter equipment 210 which, in turn, is coupled to the Dryer_02 which has dryer equipment 220. The filter equipment 110 and 210 and the dryer equipment 120 and 220 may have additional control elements (such as heaters, conveyor belts and the like), sensors, etc. associated therewith. If desired, although not shown, each of the filter units Filter_01 and Filter_02 may be physically coupled to each of the reactor units Reactor_01 and Reactor_02 while each of the dryer units Dryer_01 and Dryer_02 may be coupled to each of the filter units Filter_01 and Filter_02 so that a batch run using one of each of a reactor, a filter and a dryer may use any combination of the equipment illustrated in FIG. 1.

As illustrated in FIG. 1, the controller 12 is communicatively coupled to the valves 101-103, 201-203, to the devices 105, 205, to the filters 110, 210 and to the dryers 120 and 220 (and to the other equipment associated therewith) via the bus 18 to control the operation of these elements (which may be units, field devices, etc.) to perform one or more operations with respect to these elements. Such operations may include, for example, filling the reactor vessels, or dryers, heating the material within the reactor vessels or dryers, dumping the reactor vessels or dryers, cleaning the reactor vessels or dryers, operating the filters, etc. Of course, the controller 12 could be coupled to the elements within the process plant 16 via additional busses, via dedicated communication lines, such as 4-20 ma lines, HART communication lines, etc.

The valves, sensors and other equipment illustrated in FIG. 1 may be any desired kind or type of equipment including, for example, Fieldbus field devices, standard 4-20 ma field devices, HART field devices, etc. and may communicate with the controller 12 using any known or desired communication protocol such as the Fieldbus protocol, the HART protocol, the 4-20 ma analog protocol, etc. Still further, other types of devices may be connected to and be controlled by the controller 12 in any desired manner. Also, other controllers may be connected to the controller 12 and to the workstations 14 via, for example, the Ethernet communication line 15 to control other devices or areas associated with the process plant 16 and the operation of such additional controllers may be coordinated with the operation of the controller 12 illustrated in FIG. 1 in any desired or known manner.

A user may configure recipes, form equipment trains from process control equipment such as devices valves 101-102 and a vessel 100, associate the equipment trains with batches and interact with the batch subsystem 30 via the BOI 34 or other interface tools. The BOI 34 may retrieve the status of each batch running in the system either periodically or in real time. The batch execution environment of the network 10 and, in particular, the batch subsystem 30 working in cooperation with the BOI 34 and the configuration database 34, allows the user to select a running batch, temporarily suspend the batch, view the recipe being executed by the batch, and make changes to the recipe either on a high level or in one of the lower layers by "drilling into" recipe elements. The user may then save the updated recipe to the configuration database 34, and optionally request the batch subsystem 30 to resynchronize the suspended batch with the new version of the recipe according to one of the selected resynchronization options. The modules and methods involved in synchronizing and executing new recipe versions with the running batches are discussed in detail below in reference to FIGS. 3-11.

The batch subsystem 30 includes a high level control routine that enables a user to specify a number of batch runs to be performed within the process plant and that sets up a number of different batch runs or batch processes to operate essentially independently within the process plant control network 10 to implement the different batch runs. Each such batch process directs the operation of one or more unit procedures, which are sub-routines or processes that operate on a single unit, such as one of the reactor units, the filter units, the dryer units, or other equipment within the process plant. Each unit procedure (which is a part of a batch run that is generally run on one of the workstations 14) may perform a series of operations, each of which may perform one or more phases on a unit. For this discussion, a phase is the lowest level action or step performed on a unit and is typically implemented or executed in one of the controllers 12, an operation is a set of phases that performs a particular function on the unit and is typically implemented or executed on one of the workstations 14 by calling a series of phases within the controller 12, while a unit procedure is a series of one or more operations performed on a single unit and is typically implemented as a set of operation calls on one of the workstations 14. As a result, any unit procedure can include one or more phases and/or one or more operations. In this manner, each batch process performs different steps or stages (i.e., unit procedures) needed to produce a product, such as a food product, a drug, etc.

To implement different unit procedures, operations and phases for an individual batch, a batch process uses what is commonly referred to as a recipe which specifies the steps to be performed, the amounts and times associated with the steps and the order of the steps. Steps for one recipe might include, for example, filling a reactor vessel with the appropriate materials or ingredients, mixing the materials within the reactor vessel, heating the materials within the reactor vessel to a certain temperature for a certain amount of time, emptying the reactor vessel and then cleaning the reactor vessel to prepare for the next batch, running a filter to filter the output of a reactor and then running a dryer to dry the product created in the reactor vessel. Each of the series of steps associated with a different unit defines a unit procedure of the batch and the batch process will execute a different control algorithm for each one of these unit procedures. Of course, the specific materials, amounts of materials, heating temperatures and times, etc. may be different for different recipes and, consequently, these parameters may change from batch run to batch run depending on the product being manufactured or produced and the recipe being used. Those skilled in the art will understand that, while control routines and configurations are described herein for batches using the reactor units, the filter units and the dryer units illustrated in FIG. 1, control routines may be used to control other desired devices to perform any other desired batch process runs or to perform continuous process plant runs, if so desired.

As will also be understood by those skilled in the art, the same phases, operations or unit procedures of a generic batch process can be implemented on each of the different reactor units of FIG. 1 at the same or at different times as part of different actual batch processes. Furthermore, because the reactor units of FIG. 1 generally include the same number of and types of equipment (i.e., they belong to the same unit class), the same generic phase control routine for a particular phase may be used to control each of the different reactor units, except that this generic phase control routine has to be modified to control the different hardware or equipment associated with the different reactor units. For example, to implement a fill phase for Reactor_01 (wherein the reactor unit is filled), a fill control routine will open one or more of the input valves 101 or 102 for a certain amount of time, for example, until the fluid level meter 105 senses that the vessel 100 is full. However, this same control routine may be used to implement a fill phase for Reactor_02 by merely changing the designation of the input valve(s) to be the valves 201 or 202 instead of the valves 101 or 102 and by changing the designation of the fluid level meter to be the fluid level meter 205 instead of the fluid level meter 105.

Figure 2:
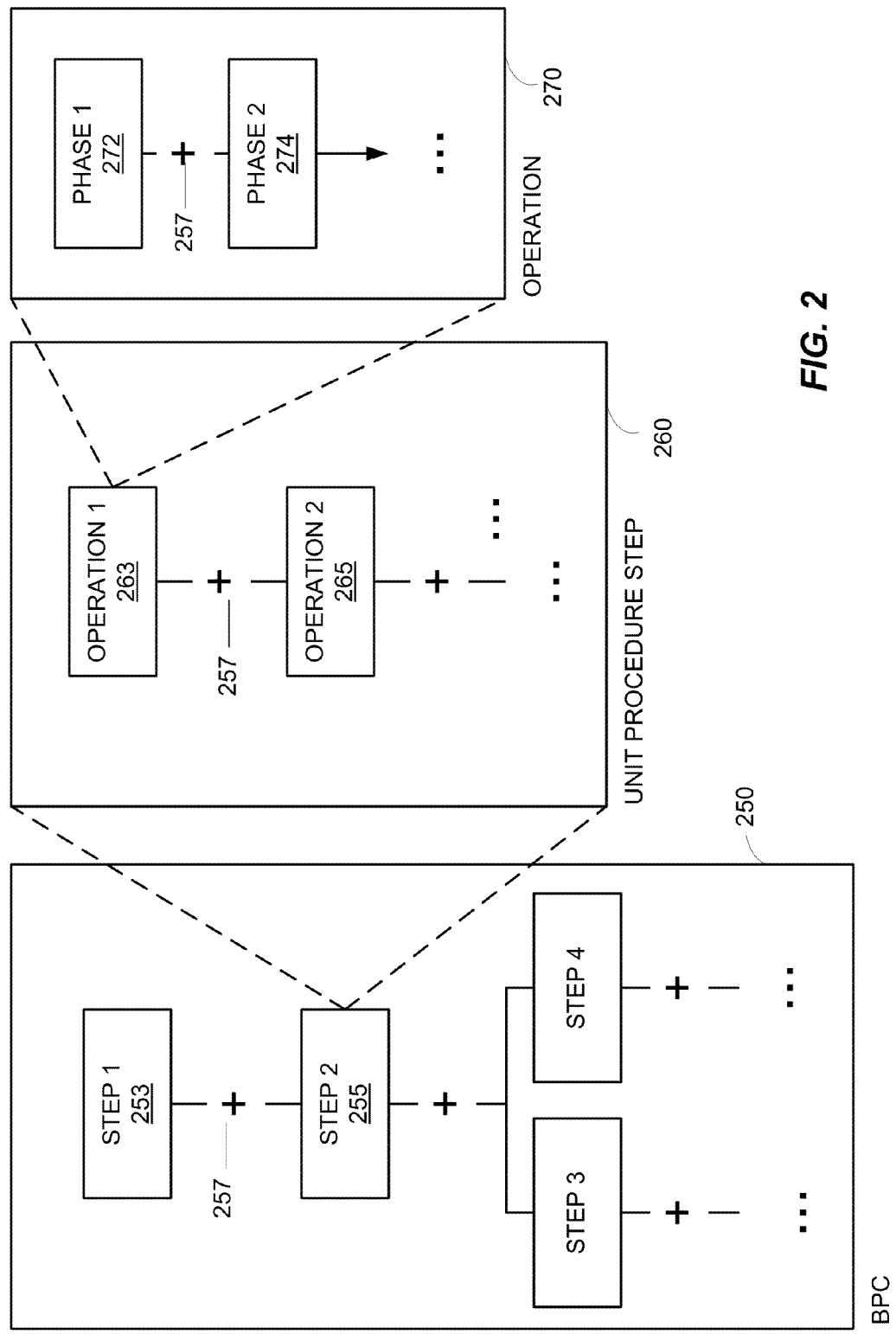
FIG. 2 is a block diagram illustrated the nested structure of a recipe consistent with the S88 standard.

Although the logic associated with the general operation of batch runs is well known, FIG. 2 provides a summary overview of a recipe structure relevant to the method of online recipe synchronization in a batch execution environment. A recipe 255 is compliant with the hierarchical structure of the S88 standard. However, one skilled in the art will appreciate that the method of online recipe synchronization may also apply to other existing and future recipe definition standards. As illustrated in FIG. 2, the recipe 255 includes one or more steps, such as steps 253 and 255, separated by transitions 257. Each of the steps of the recipe 255 may have a complex internal structure and may be defined as a separate unit procedure. For example, the step 255 may be defined as a unit procedure 260.

The transition 257 may specify a condition which must be met within the step 253 prior to performing the step following the transition 257 (in this case, the step 255). For example, the step 253 may perform a mixing of two chemicals the condition 257 may check whether the mixing has exceeded a 2-minute time limit. As another example, the transition 257 may be set to Boolean "true" in order to affect transition regardless of the result of executing step 253. In general, the conditions may be simple or compound, and may include Boolean operands such as "and" and "or." The unit procedure 260 may, in turn, include one or more operations 263 or 265 similarly separated by conditions 257. In the example illustrated in FIG. 2, the operation 261 is implemented according to an operation definition 270. The operation definition 270 may include or more phases 272 and 274 separated by conditions 257.

A user may create recipes such as the recipe 250 a dedicated software on one of the workstations 14 or 14*a*. In some embodiments, the software creation software is provided as part of the BOI 32. One such software package is the Recipe Studio provided as part of the DeltaV™ system. In addition to assigning a name to the recipe 250, the user may associate the recipe with a certain version. In other words, the user may create an initial version of the recipe 250, assign the name "Chocolate_Cookie_001" to the recipe 250 and associate a version identifier "v1" with the recipe 250. At a later time, the user may create another version of the same recipe 250 and associate the new version with a version identifier "v2," for example. In one embodiment, the configuration database 34 may contain two recipes with the same name but different version identifiers. In another embodiment, the user may simply save the new version under the same name as the previous version.

In either case, new recipe versions always arrive from the user interface 32 or other recipe creation tool at the configuration database 34 via the batch subsystem 30. In other words, the batch system 30 passes recipe information between the user and the configuration database 34 so that the batch system 30 is always aware of the changes to the existing recipe versions. In this manner, the batch system 30 may synchronize the new recipe versions with batches running within the subsystem 30 when necessary. In another embodiment, the user interface 32 interacts with the configuration database 34 directly. In order to automate at least some aspects of recipe resynchronization (as discussed in greater detail below), the user interface 32 or the configuration database 34 includes a software routine duplicating recipe information for the batch subsystem 30. As yet another alternative, the user interface 32 directly interacts with the configuration database 34 and the batch system 30 periodically requests updates from the configuration database 34. For example, the batch system 30 may run a background process waking up according to a predefined timeout value in order to inquire whether new versions of the recipes being executed by the batch system 30 have become available at the configuration database 34 since the last inquiry. However, one skilled in the art will appreciate that by placing the batch subsystem 30 between the user interface tools and the configuration database 34, the batch execution environment may be implemented more efficiently.

Figure 3:
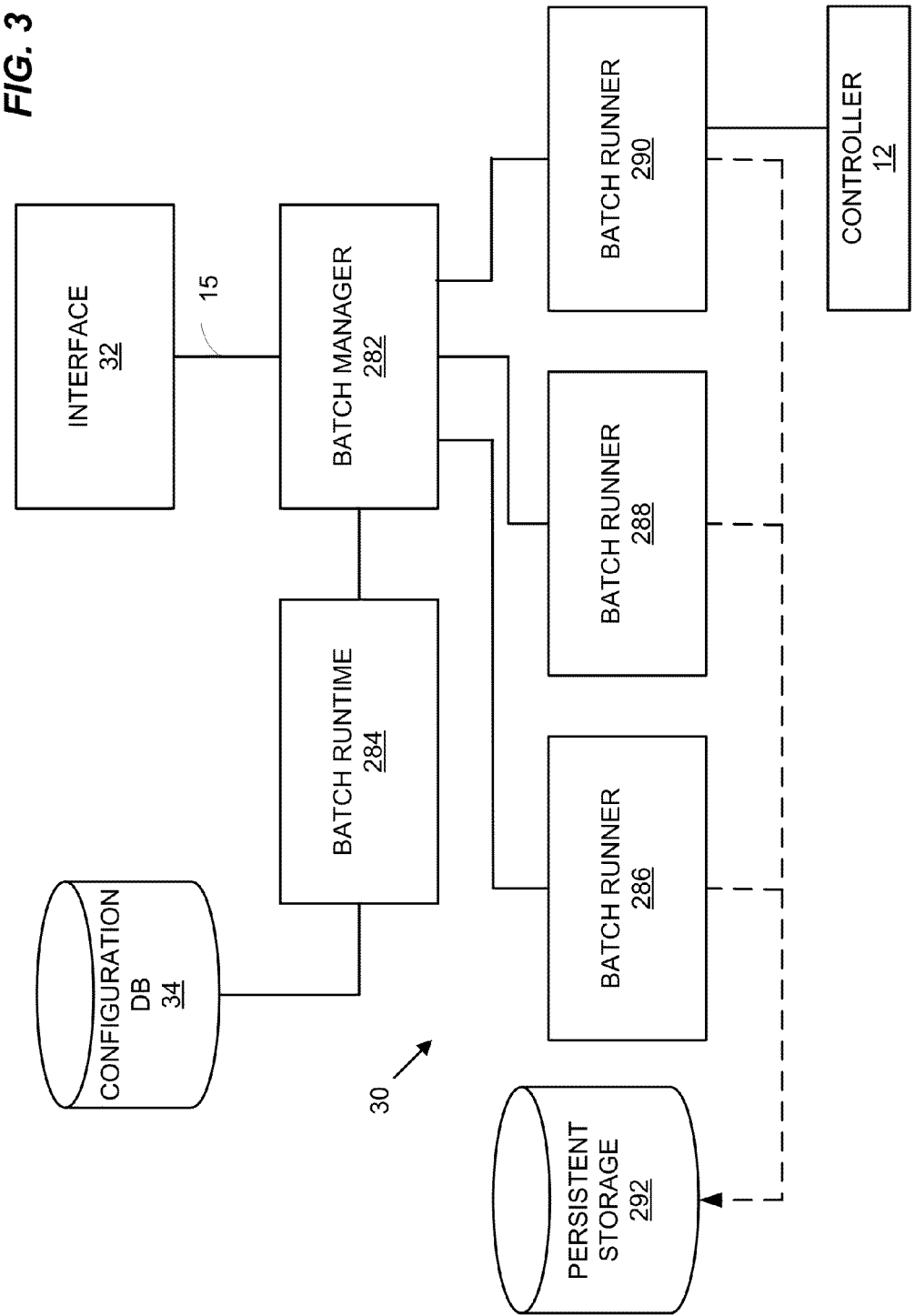
FIG. 3 is a block diagram illustrating an exemplary architecture of a batch subsystem interacting with the configuration subsystem in a batch execution environment.

FIG. 3 illustrates an exemplary architecture of a batch subsystem 30 in a process plant control network 10. The batch executive subsystem 30 may interact with a user interface tool such as the BOI 30 via the Ethernet communications connection 15 or, if the batch subsystem 30 and the user interface 30 reside on the same workstation 14 or 14a, via one of the known inter-process communication (IPC) means. The batch subsystem 30 may include a batch manager 282, a batch runtime process 284, and one or batch runners 286-290. Each of the components of the batch subsystem 30 processes may be implemented as an independent process or a thread. As indicated above, the batch subsystem 30 may be distributed over several workstations or other hosts.

Each of the batch runners 286-290 executes exactly one batch. Some of the batch runners 286-290 may run the same recipe such as, for example, the recipe 250. It will be appreciated that the batch runners 286-290 need not be in the same state of execution at all times even if each of the batch runners is executing the same recipe. In the example illustrated in FIG. 3, the batch runner 290 is connected to the controller 12 via the Ethernet connection 15. In operation, the batch runner 290 may execute the logic on the level of unit procedures and operations in the process space on the corresponding workstations 14 or 14a. However, the batch runner 290 loads the phases 272 and 274 of each operation into the controller 12.

Referring again to FIG. 3, a persistent storage unit 292 may retain state, transition, and parameter information related to each of the batch runners 286-290. The persistent storage 292 may be a hard disk drive of one of the workstations 14 or 14a, an external storage device such as a CD or DVD, or other known data storage devices. The batch manager 282, the batch runtime process 284, and each of the batch runners 286-290 may access to the persistent storage 292 via the Ethernet connection 15 or through IPC calls if the persistent storage 292 resides on the same host. In operation, each of the batch runners 286-290 saves information related to the execution status of the corresponding batch. For example, the batch runner 290 may record the state of the currently running unit procedure, operation, and phase. Thus, a record in the persistent storage unit 292 may at some point indicate that the batch runner 290 is currently executing step 3, operation 1, phase 2 of the recipe 250. Additionally, the record may specify the state of the each of the levels, such as RUNNING, HELD, or ABORTED, for example. Further, the batch runner 290 may record the values of parameter passed into a unit procedure, operation, and phase. The batch runner 290 preferably updates the persistent storage unit 292 in substantially real time.

Additionally, the batch runner 290 may record each transition 257 between, for example, steps 253 and 255, operations 263 and 265, and phases 272 and 274. The transition may be recorded in the persistent storage 292 along with the state and parameter information. Alternatively, state transitions may be recorded as separate event logs stored in the data historian 19. Even logs may also include some or all of the parameter information and such additional information as timestamps associated with each transition, error conditions, and other information useful for monitoring or debugging the system in post-time. The even logs may similarly store synchronization indications. For example, a certain record in the even log may indicate that the batch runner 290 resynchronized with the version v2 of a recipe "Chocolate_Cookie_001" at step 3, operation 1, phase 1 at 14:25 p.m. on September, 21.

As indicated above, the batch manager 282 controls the execution of the batch runners 286-290. In particular, the batch manager 282 sends commands to the batch runners 286-290 indicating to the batch runners when to start, stop, or pause execution. Additionally, the batch manager 282 reports the status of each of the batch runners 286-290 to an operator via the user interface tool 280. For example, the batch manager 282 may access the persistent storage 292 to retrieve the state of the batch runner 290 and may report the state to the interface tool 280 in form of a message consistent with a well-known format such as XML or a special purpose format defined specifically for the interaction between the elements of the batch subsystem 30. In this sense, the batch manager 282 serves as a centralized gateway to all batch runners.

In one embodiment, the batch manager 282 and the batch runners 286-290 additionally have access to a shared memory region storing copies of the recipe currently being executed by the batch subsystem 30. The shared memory region may be a persistent or volatile memory location and may be disposed inside or outside the batch subsystem 30. In some embodiments, the batch manager 30 saves a copy of each recipe prior to triggering a run of the recipe by one of the batch runners 286-290. In another embodiment, an individual batch runner saves a copy of the recipe in its own process space or in a permanent location unknown or inaccessible to the rest of the batch subsystem 30. In either case, the batch subsystem 30 may store each recipe as a single file or as an hierarchical structure of elements. Preferably, the batch manager 282 and each of the batch runners 286-290 have means of accessing individual recipe elements such as unit procedures, operations, and phases for reading and writing.

Meanwhile, the batch runtime process 284 serves as an interface with the rest of the process plant control network 10. In particular, the batch runtime 284 may interact with the configuration database 34 through recipe download scripts. In one embodiment, the user interface 32 packages recipes in XML in order to allow for both human and machine readability. Alternatively, the user interface 32, the batch subsystem 30, and the configuration database 34 may send script information over any standard or proprietary protocol. The batch runtime process 284 may be also responsible for such functions as maintaining system security and log maintenance. Moreover, the batch runtime process 284 may record start, stop, and other relevant high-level information in the persistent storage 292 or in the configuration database 34.

Further, the batch runtime process 284 may identify the changes to a particular recipe relative to an earlier version of the same recipe. For example, a single small parameter of certain operation, such as the amount of time a mixer should run, may change from 25 minutes to 30 minutes. Upon receiving a new, 30-minute version of the recipe, the batch runtime process 284 may first send a query the batch manager 282 to check whether any of the batch runners 286-290 are currently running the old version of the same recipe. In one embodiment, the batch runtime process 284 and the batch manager 286 may simply compare the names of the recipes in order to determine whether the new recipe is currently being run in the batch subsystem 30. To this end, the batch manager 286 may store the name or other unique identifier of a recipe for each active batch runner. In response to the query from the batch runtime process 284, the batch manager 286 may indicate, for example, that the recipe is applicable to one or more of the active batch runners 286-290. The batch runtime process 284 may then retrieve the original recipe from the configuration database 34 and perform a comparison between the new and the old recipe versions. Alternatively, the user interface 32 may generate and propagate a "marked-up" copy of the recipe identifying the changes made by the user.

Figure 4:
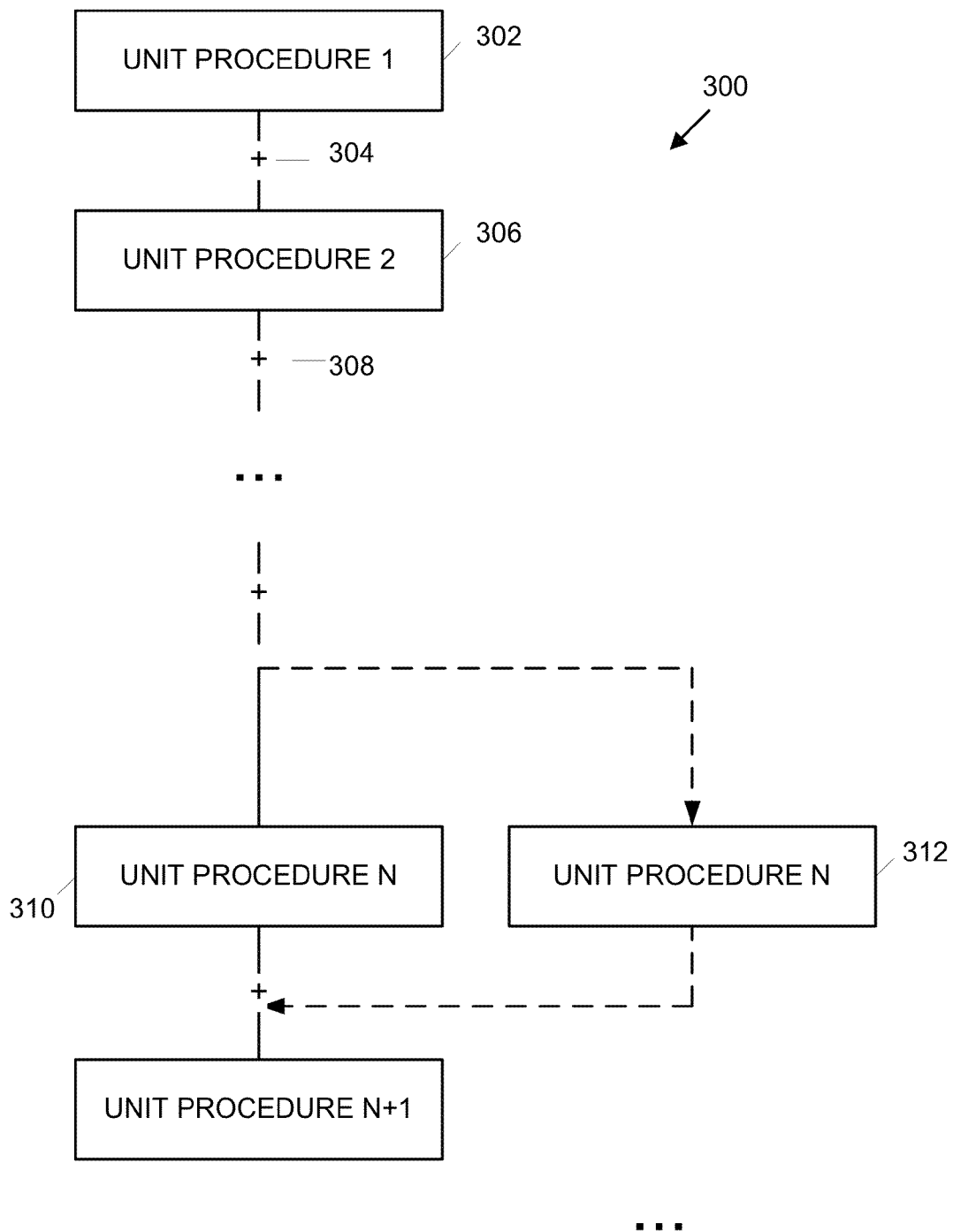
FIG. 4 schematically illustrates online batch synchronization with a recipe version in which one recipe element is updated without a change in the name of the element.

As indicated above, recipe updates may fall into one of the several categories depending on the extent of changes made by the user. FIG. 4 illustrates an exemplary update scenario which includes a modification inside of the unit procedures without a change to the name of the unit procedure. It will be appreciated that this scenario is also analogous to a case in which the modification is made inside an individual operation retaining the original operation name. As illustrated in FIG. 4, both the new and the old versions of the recipe 300 include a step 302 followed by a transition 304, followed by a step 306. However, the user may have updated the unit procedure corresponding to the step 310 and may request the subsystem 30 to execute the step 312 instead of the step 310 once the corresponding batch reaches the transition 308. The step 312 differs from the step 310 only in the version of the executed unit procedure.

In some embodiments of the batch execution environment and, in particular, of the batch subsystem 30, a user may wish to avoid saving a new version of a recipe or recipe element under the same name. In some cases, users may not be allowed to duplicate the existing recipe or procedure names as a matter of policy. In this and similar situations, the user interface 32 may automatically generate a new name of the unit procedure, such as UPROC_MIX_INGREDIENTS_ 012_V02, to differentiate the new version of the recipe 300 from the previous version named UPROC_MIX_INGREDIENTS_012_V01. The name is such that a machine script may easily parse the name and extract the version number and other identifiers.

Figure 5:
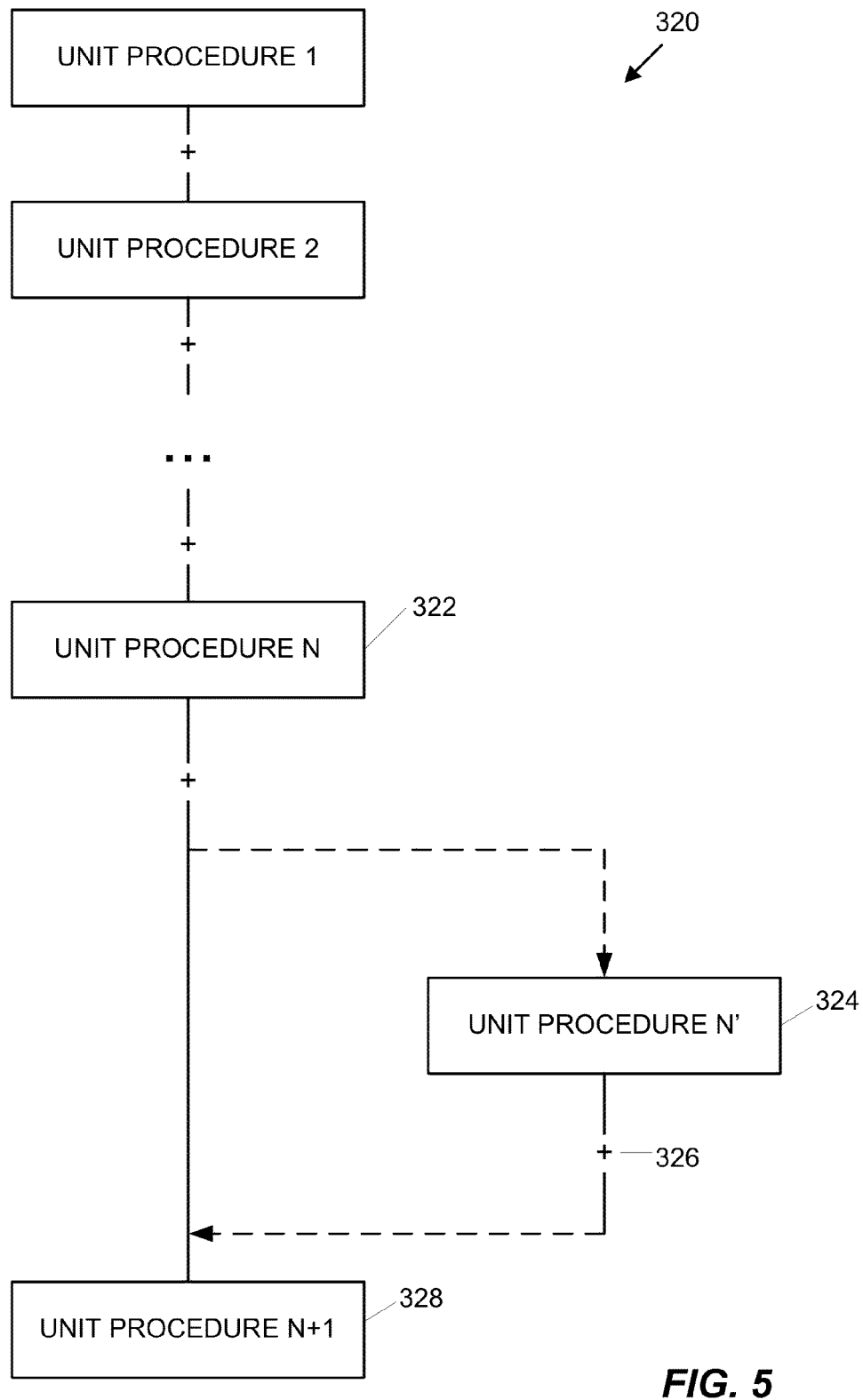
FIG. 5 schematically illustrates online batch synchronization with a recipe version to which a new recipe element has been added.

Meanwhile, the scenario illustrated in FIG. 5 includes an addition of a new recipe element to a recipe 320. In particular, the new version of the recipe 320 requires that a step 322 be followed by a new step 324 and a transition 326. The transition 326 directs the flow of the recipe 320 back to an original step 328. It will be appreciated that the scenario illustrated in FIG. 5 differs from manually executing a phase within the scope of an existing batch. In particular, the new step 324 is connected to the existing steps 322 and 328 by means of S88-compliant transitions. In other words, the user need not manually control transitions after adding new recipe elements. Moreover, the procedure step 324 becomes a part of the recipe 320 and, as a result, the event from the new step 324 may be collected as part of batch running the recipe 320.

Figure 6:
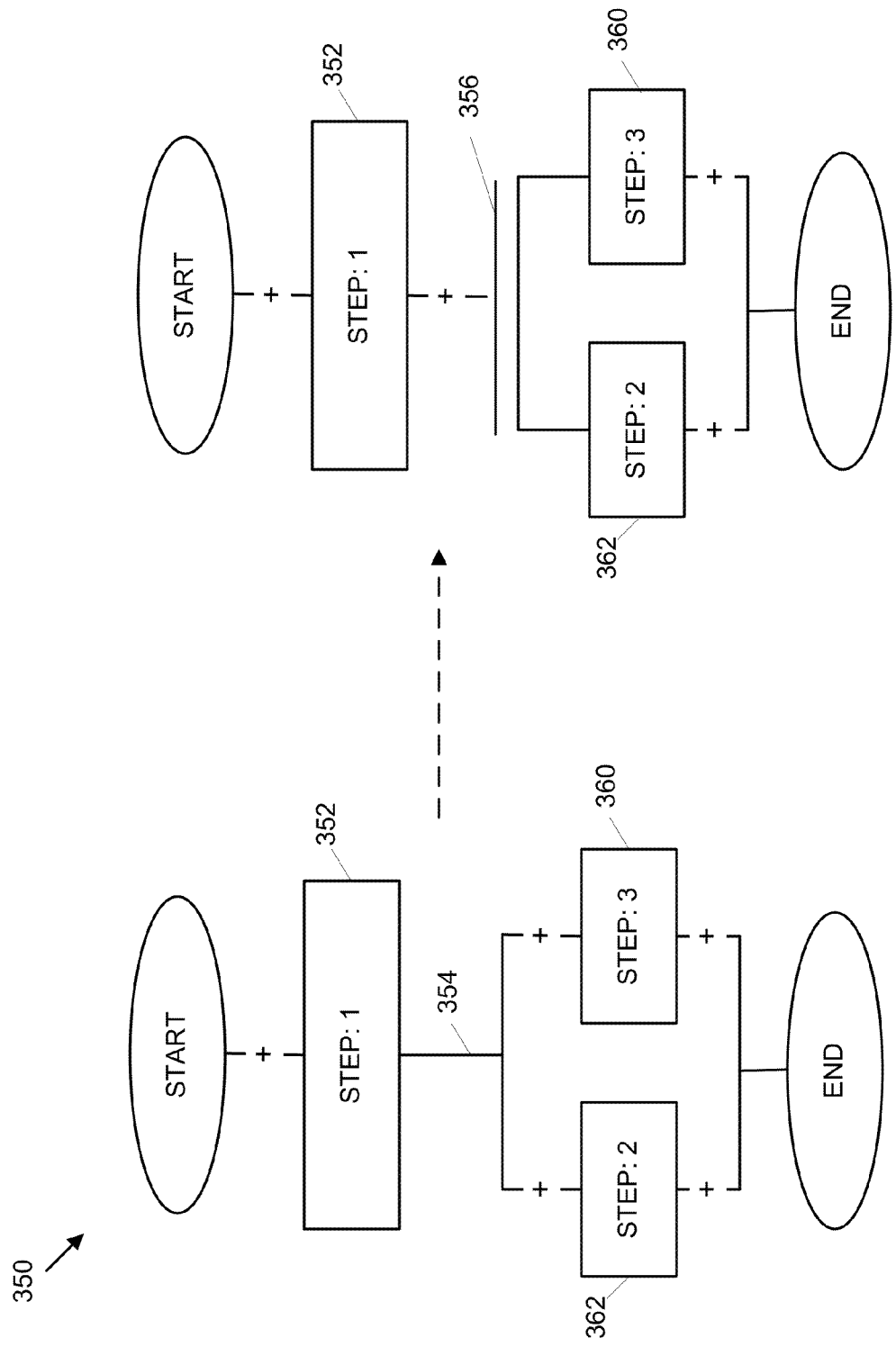
FIG. 6 schematically illustrates online batch synchronization with a recipe version in which some of the conditional logic has been updated.

Referring to FIG. 6, a new version of a recipe 350 includes a change in recipe logic following a step 352. In particular, the new version the recipe 350 changes the condition 354 ("OR") to condition 356 ("AND"). In this scenario, the unit procedures of the recipe 350 may not change at all. However, the user may decide, for example, to try adding both chocolate (step 360) and vanilla (step 362) to ice cream produced by a batch executing the recipe 350 instead of selecting one of chocolate and vanilla according to the previous version of the recipe 350.

In the scenarios described above in reference to FIGS. 4-6, the subsystem 30 may keep the previous version of the recipe 300, 320, or 350 in a persistent or volatile memory because one of the batch runners 286-290 may be currently executing this recipe. In one embodiment, the batch runtime process 284 may notify the batch manager 282 with the name or unique identifier of the updated recipe 300, 320, or 350 and, additionally, with a list of specific elements updated in the recipe 300 on the unit procedure or operation level. The batch manager 282 may indicate to the batch runner 286 executing the recipe 300, for example, that the batch execution must be suspended upon reaching the transition 308. The batch manager 282 may then update either the entire copy of the recipe 300 or the copy of the unit procedure corresponding to the step 310 saved in the batch subsystem 30.

However, the batch manager 282 need not always synchronize each of the batch runners 286-290 running the recipe 300 upon being notified that a new version of the recipe 300 is available and the differences have been processed by the batch runtime process 284. Importantly, a user may select which of the batch runners 286-290 should synchronize with the new recipe version and which should continue executing the original recipe either until completion or until receiving a new abort or suspend command from the user. In this respect, online recipe resynchronization supported by the batch subsystem 30 in cooperation with the configuration subsystem of the process plant control network 10 allows users to "try out" new recipe versions on a controlled scale prior to adapting the new recipe version across the entire batch subsystem 30 or the entire process plant 16.

Figure 7:
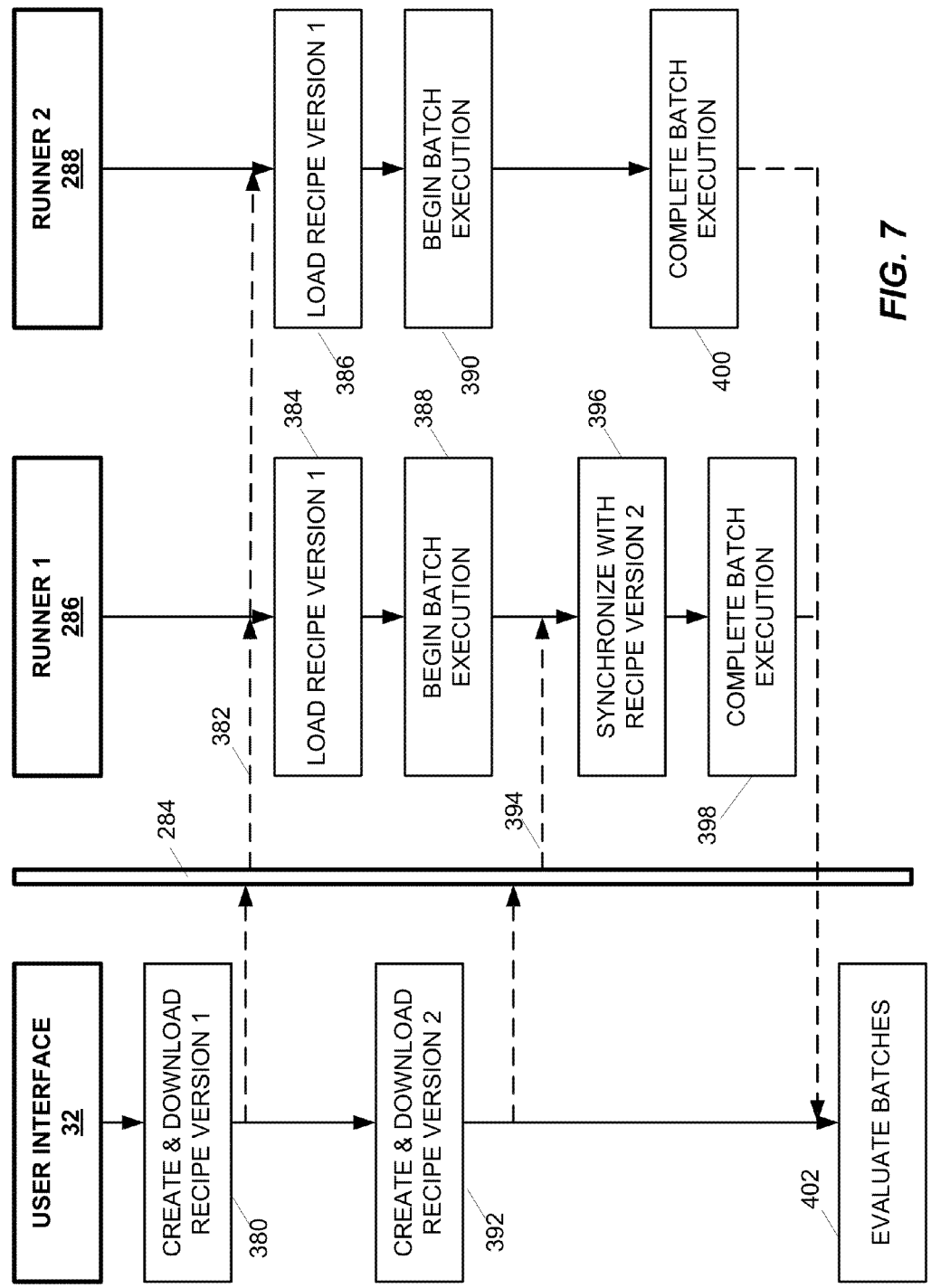
FIG. 7 is a block diagram illustrating a high-level interaction between a recipe configuration subsystem and a batch subsystem during the resynchronization of a batch in an exemplary batch execution environment.

FIG. 7 illustrates one such contemplated scenario in more detail. In this example, the user operates the user interface software such as the BOI 32 to create a first version of a certain recipe (block 380). At this point, the user may be planning to run two parallel batches with the first version of the recipe. The user interface 32 passes recipe to the batch subsystem 30 via the batch runtime process 284. In addition to saving the recipe in the configuration database 34, the batch runtime process 284 passes the first version of the recipe to the batch manager 282 which, in turn, applies the recipe to the available batch runners 286 and 288 (step 382). The recipe is loaded into batch runners 286 and 288 in blocks 384 and 386, respectively.

The batch manager 282 may then trigger the execution of the recipe in the batch runners 286 and 288. In a block 388, the batch runner 286 may start executing the steps of the recipe and the batch runner 288 may similarly begin batch execution in a block 390. Meanwhile, the user may decide that the recipe may be improved by one or more relatively small changes to the original version. To this end, the user may create a new version of the recipe in a block 392. Moreover, the user may want the changes to go into effect as soon as possible. At the same time, the user may be concerned about applying the new recipe across the entire batch subsystem 30 and may deem it more prudent to apply the recipe to only one of the batches first.

In some embodiments, the user may know the precise state each batch runner is in. In other embodiments, the batch interface 32 may selectively present state and transition information to users depending on the users' access privileges or profile configuration. While the user may not always know whether the execution of the recipe has already progressed passed the point at which resynchronization is still possible, the user may nevertheless instruct the user interface 32 to save the new version of the recipe under the original recipe name or under a name accurately reflecting the recipe version, place the batch runner 286 on hold by typing in a command from a prompt or by operating a visual control on the batch interface 32, and request the batch subsystem 30 to synchronize the batch runner 286 with the new version.

Alternatively, the user may instruct the user interface 32 to apply the new version to the batch subsystem 30 wherever possible. Of course, both options also may be made available in the same embodiment of the batch subsystem 30. Moreover, it is contemplated that resynchronization may be provided as a single control which may automatically interact with the batch subsystem 30 to determine to which batch runners, if any, the new recipes applies, and automatically place the relevant batch runners on hold. Further, the user interface 32 may display a confirmation dialogue to the user informing him or her about the batch processes which potentially may be synchronized with the new recipe version.

The batch interface 284 may determine which changes to the first version of the recipe may apply to the batch runner 286 and pass the relevant update information to the batch runner 286 (directly or via the batch manager 282). The batch runner 286 may delete the original version of the recipe from the corresponding memory location, save the new version, identify the step to be executed next, and wait from the user interface to propagate a command from the user (not shown) telling the batch runner 286 to resume execution (block 396). As will be discussed below, the user may provide additional instructions to the batch subsystem 30 regarding the particular step in the recipe from which the batch runner 286 may resume execution. The batch runner 286 may continue the execution if synchronization is successful. However, the user may have changed the original version of the recipe in an erroneous or illegal manner. Upon encountering an invalid transition, a missing step, or other abnormal situation, the batch runner 286 may change its state RESYNCHRONIZATION_FAILED, for example. In some contemplated embodiments, the batch runner 286 may automatically revert to a previous (stable) version of the recipe. In another embodiment or in accordance with another configuration option, the batch runner 286 may sometimes attempt "cold resynchronization," or starting the new recipe from the first step.

In blocks 398 and 400, the batch runners 286 and 288 may complete the respective batches. The user may evaluate the results of batch execution in a block 402 and may decide if the batch runner 286 should revert to the original recipe version or if the new version of the recipe should be applied to the batch runner 288 as well. In particular, the batch runner 286 may fail to fully execute the new untested version of the recipe. In this case, the batch subsystem may automatically change the status of the batch to HELD or similar state indicative of suspended execution. The user interface 32 may, in turn, generate an interactive dialogue displaying the question "Revert to the previous version? Yes/No?"

Figure 8:
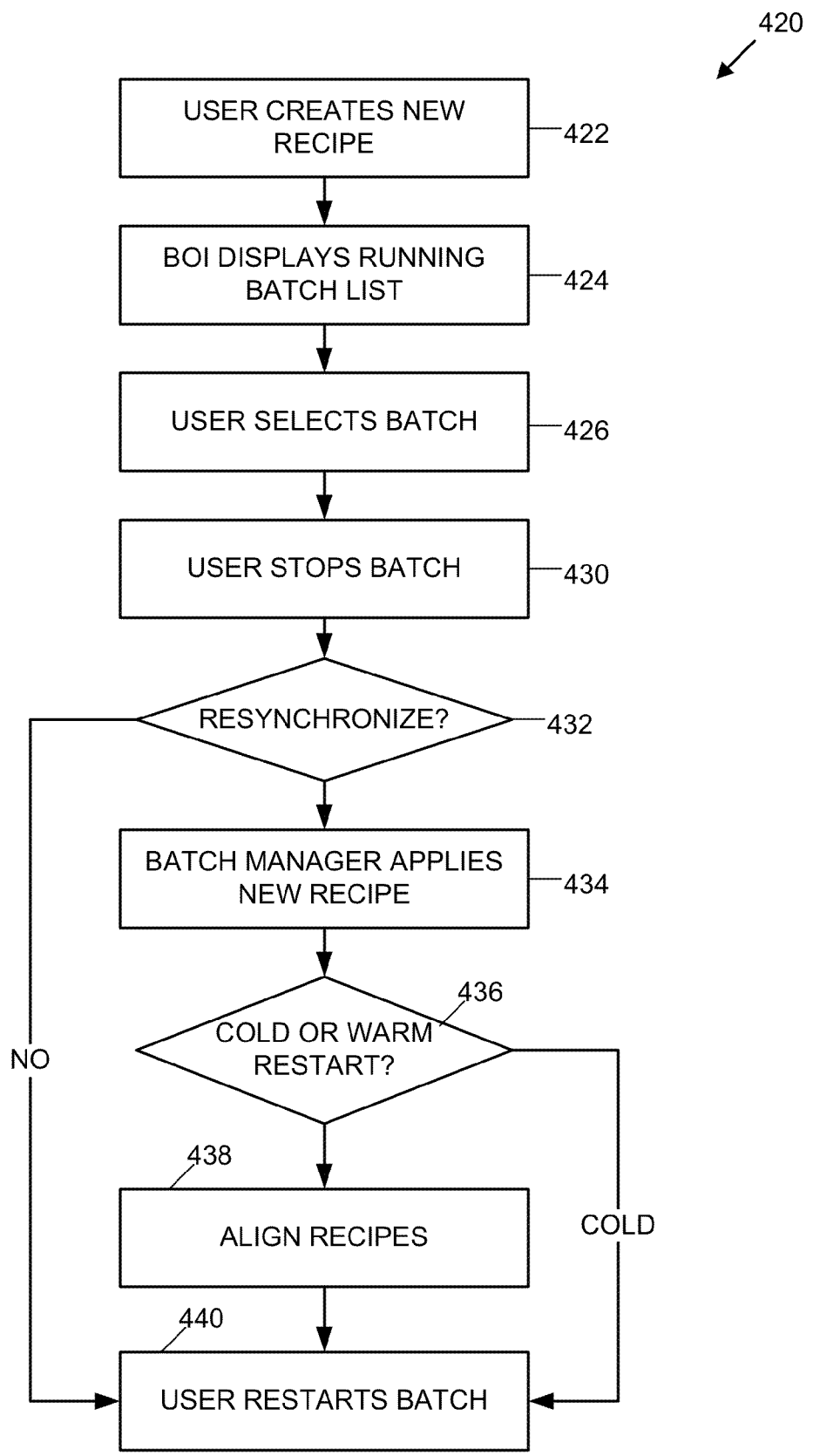
FIG. 8 is an exemplary flowchart illustrating a resynchronization procedure performed by a system illustrated in FIG. 3.

FIG. 8 is an exemplary flowchart illustrating a resynchronization procedure 420 distributed over the batch subsystem 30 and parts of the configuration subsystem such as the user interface 32. In a block 422, a user may retrieve a recipe from the configuration database 34 and create a new version of the recipe. In a block 424, the BOI 32 may display a list of currently active batches, a state of each batch, and recipe information for each active batch. The user may select one of the batches in a block 426 and change the operational state of the batch to STOPPED or ABORTED in a block 430. In the example illustrated in FIG. 8, the user selects a batch running an older version of the recipe updated in the block 422.

The user may choose whether to continue running the original version of the recipe or start a new version in a block 432. If the user decides to resynchronize the suspended batch, the procedure 420 may proceed to a block 434. In the block 434, the batch manager 282 may identify the batch runner executing the suspended batch and apply the recipe updates to the identified batch runner. As discussed above, the step 434 may also include saving the new recipe version in the configuration database 34, comparing the old and new versions of the recipe in the batch runtime process 284, and communicating the necessary information related to the changes to the batch manager 282.

In a block 436, the user may select between cold and warm restart options. In particular, cold restart results in the batch run starting from the first step in the recipe. On the other hand, warm restart allows the batch to resume at the current step of the recipe. The user may select the warm restart option when the new version properly aligns with the original recipe so that a transition to one or new updated or new steps does not result in an illegal condition. Referring back to FIG. 4, the user may select warm restart in order for the batch runner to seamlessly continue on to the step 312 after the transition 308. Thus, the procedure 420 may first attempt to align recipes in a block/step 438. As part of the step 438, the procedure 420 may identify which step of the recipe the batch is currently executing or which transition the batch has reached, locate the step or transition in the new recipe, and determine whether is in fact possible and allowable.

To prevent serious errors, the procedure 420 may consider changes in an active step of the batch to be illegal and may prohibit resynchronization in the active steps as a matter of policy. For example, if a certain batch is currently executing step 2/operation 1/phase 3 of a certain recipe, the procedure 420 may not allow the batch to resynchronize with a new version of the recipe if the change effects the same phase 3 within step 2/operation 1, or if the change effects the name of operation 1 within step 2, or in similar potentially contentious situations. Additionally, the procedure 420 may validate procedure and operation parameters to ensure that the new recipe does not require values which are unavailable. To take one example, the recipe may update the unit procedure 2 which requires 3 parameters in the new configuration. Meanwhile, the batch may be executing one of the operations within the unit procedure 2 which requires only 2 parameters in the current configuration. Thus, synchronizing the batch at this point impermissibly requires that another parameter be added at an earlier stage of execution of the batch (i.e., at the point where the batch enters and supplies parameters to the unit procedure 2.

Because the user may inadvertently create a condition which violates the logic of recipe execution, the procedure 420 may instead look for a valid synchronization point later in the recipe or may simply place the batch in the SYNCHRONIZATION_FAILED state. The user may then resume the run using the original recipe version or initiate a cold restart using the new recipe. If, on the hand, the synchronization is determined to valid, the procedure 420 may indicate to the user that the synchronization is complete and that the batch may be resumed. In a block 440, the user may send an appropriate command to the batch subsystem 30 and, upon receiving the command, the procedure 420 may advance the batch to the RUNNING state and the batch may continue execution.

Figure 9:
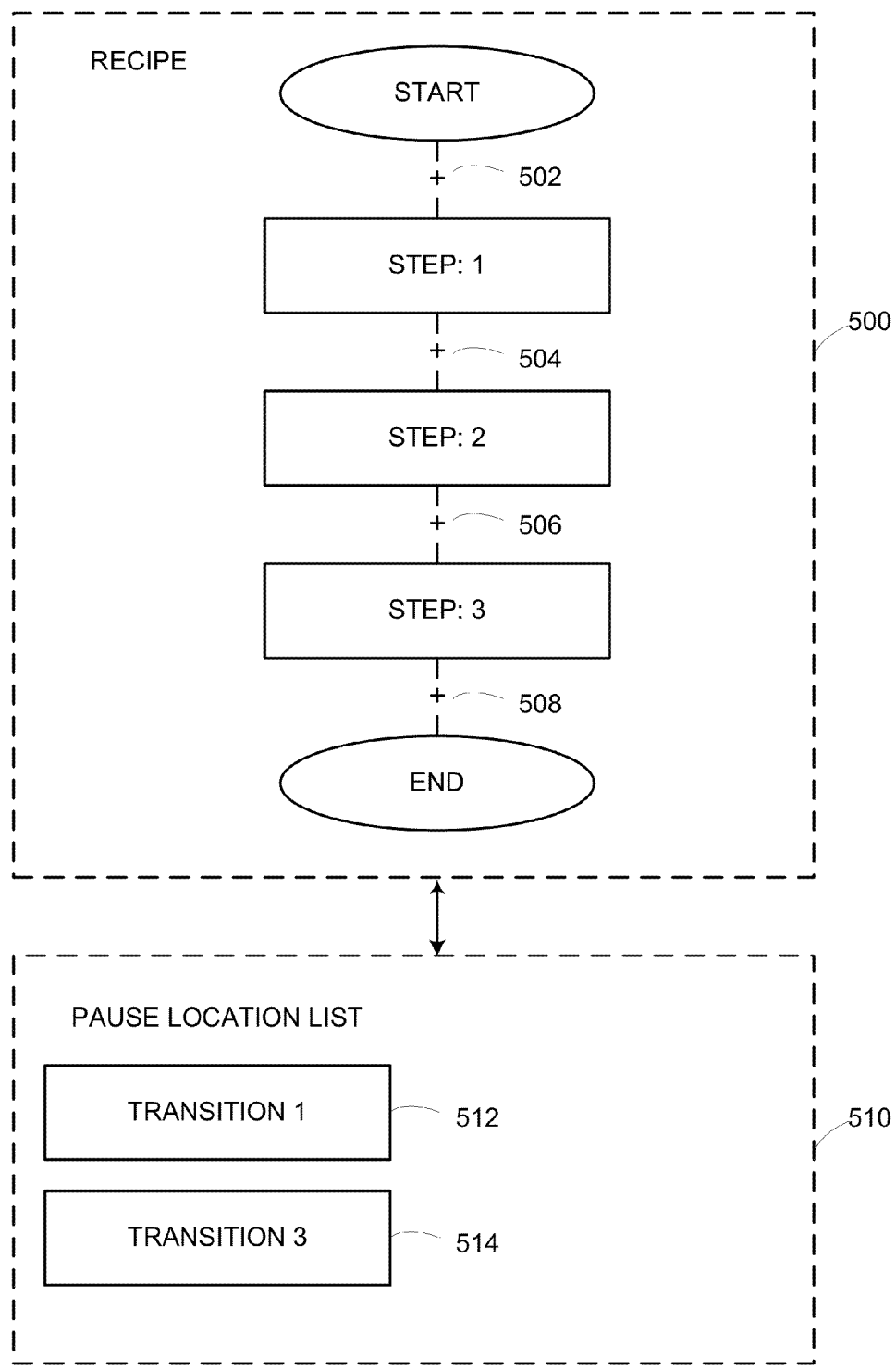
FIG. 9 illustrates a configuration of valid resynchronization points of a particular recipe.

The batch subsystem 30 may also support automatic synchronization with new recipe version via a pause location lists. As illustrated in FIG. 9, a recipe 500 includes several steps separates by transitions 502-508. Generally speaking, a recipe such as the recipe 500 may have several transitions on the batch procedure, unit procedure, and operation level. As discussed above, the user may create the recipe 500 by using the DeltaV™ Recipe Studio tool or similar means. In addition to specifying recipe elements and transitions, the user may supply a list 510 associated with the recipe 500 which includes zero or more valid resynchronization points. Alternatively or additionally, the subsystem 30 and the user interface 32 may allow users to define the list 510 for an active batch already executing the recipe 500. In a situation where an operator discovers a problem with the recipe 500 and realizes that there is at least one more batch executing the same recipe but running several steps behind the problem batch, for example, the operator may wish to define a pause location list on the fly.

In the example illustrated in FIG. 9, the list 510 includes two transition identifiers 512 and 514. The transition identifier 512 may correspond to the transition 502 while the transition identifier 514 may correspond to the transition 506. By adding the transition identifiers 512 and 514 to the list 510, the user requests that the execution of the recipe 500 be suspended upon reaching the transitions 502 and 506. In other words, the transitions 502 and 506 are always disabled. In order for a batch executing the recipe 500 to resume and for the transition 502 to 506 to fire, the batch subsystem 30 must receive an explicit command from the user.

It is also contemplated that the subsystem 30 may automatically synchronize the batch executing the recipe 500 upon reaching each of the transitions 502 and 506. To this end, the user 32 may provide a control, such as a dialogue box or a command prompt, permitting a user to select between manual and automatic synchronization modes. A user may prefer the automated mode when he or she knows, for example, that a new version of a recipe should unconditionally supersede all previous versions and that the new version may become available at a time when the operator may not be available for a manual update. In response to detecting that the user has selected the automatic mode, the batch subsystem may interrupt the execution of the recipe 500 at the transitions 502 and 506, check whether updates are available at the configuration database 34 and, if a new version is available, apply the new version to one or more corresponding batch runners. The batch subsystem may then record the event in the data historian 14 and resume the execution from the suspended the same state (i.e., perform warm resynchronization).

Figure 10:
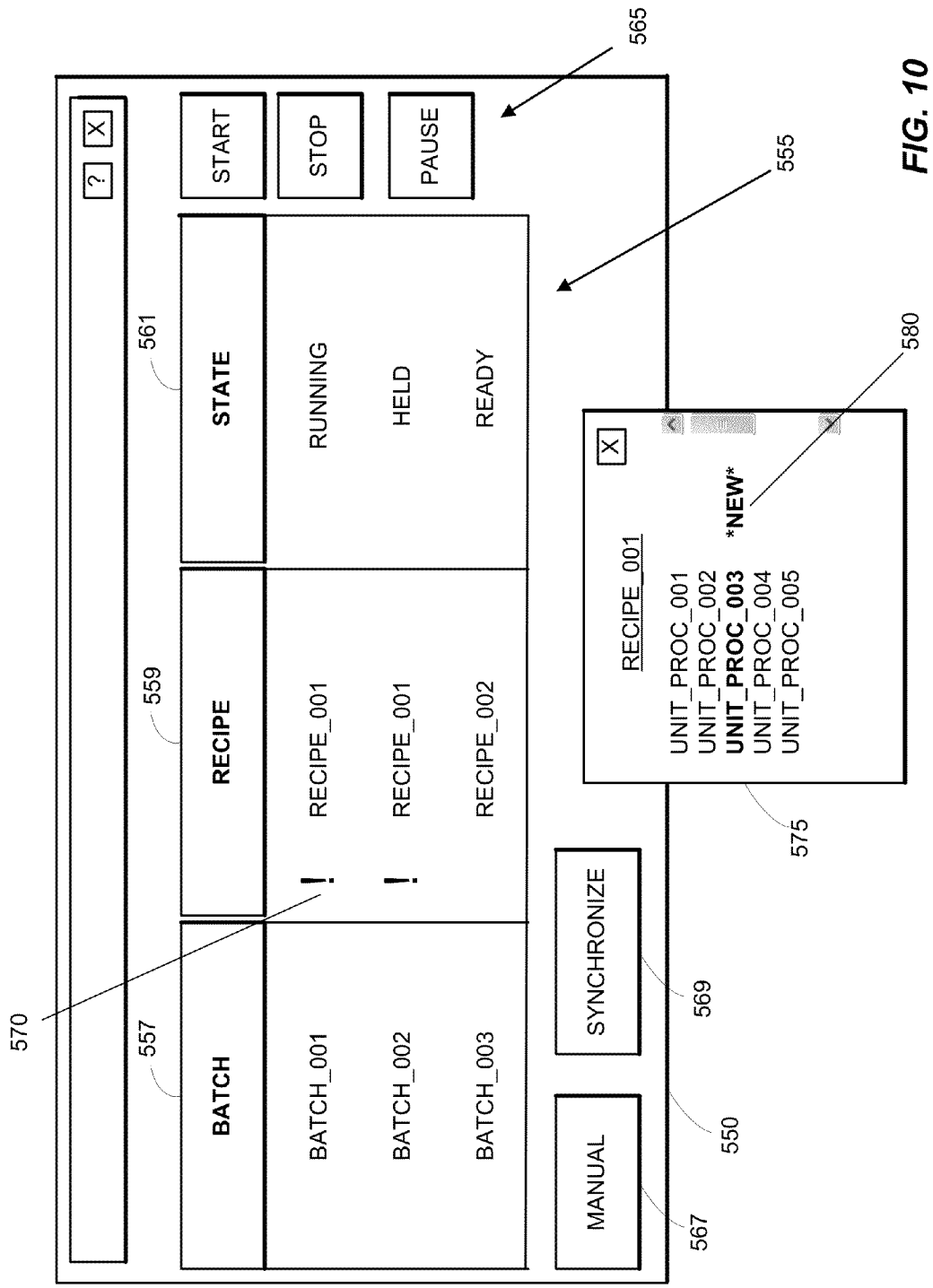
FIG. 10 illustrates an exemplary dialogue screen which may be displayed to a user during a manual resynchronization procedure.

Referring to FIG. 10, the batch runtime process 284 may periodically query the configuration database 34 to detect changes to recipes. The batch subsystem 30 may provide indications to the user interface 32 regarding the detected changes. As one skilled in the art will recognize, there may be many operators and engineers configuring and supervising a process plant control network 10. As a result, engineers may create new versions of recipes and some operators may not be aware that the updates are available. In order to minimize the impact of missed human communications, the user interface 32 may use visual indicators in batch configuration and control tools such as an exemplary window 550.

In particular, the window 550 may include a list of currently running batches 555. Preferably, the user may invoke the window 550 from every software module running in the process plant control network 10 and adapted for viewing or configuring the batch execution environment. For example, the DeltaV™ environment may provide window 550 as part of the Batch Operate software as well as part of the Batch Operational Interface software.

For each active batch, the list 555 may include a batch identification indicator 557, a recipe identification indicator 559, and a state indicator 561. Additionally, the window 550 may include batch operation control such as start, stop, and hold buttons 565. Further, by operating a button 567, the user may place the operation of a selected batch under manual control. Still further, the user may synchronize the selected batch by operating the button 569. In order for the user to effectively invoke start, stop, hold, and resynchronization options, the list 555 may include an update indicator 570. As illustrated in FIG. 10, the update indicator 570 may be activated in a line corresponding to recently updated recipe. For example, the recipe 001 may have been updated after the batch 001 was started but the operator may not be aware of the update.

The user may double-click on the line showing the update indicator 570 or invoke a detailed recipe window 575 in a similar manner. The detailed recipe window 575 may highlight or otherwise identify one or more parts of the recipe in which the batch runtime process 284 has detected one or more changes. In the example illustrated in FIG. 10, the recipe element 580 included in the recipe currently executed by the batch 001 is different from the new version. The user may view the changes to the recipe element 580 and synchronize the recipe 001 in a manual or automated manner.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A method of executing a plurality of batch processes within a process plant according to a product recipe, wherein the product recipe specifies a plurality of actions and a plurality of parameters, the method comprising:

receiving a first version of the product recipe;

applying the first version of the product recipe to a first batch runner and a second batch runner, wherein each of the first batch runner and the second batch runner controls the execution of the product recipe using respective process control equipment;

initiating a respective batch run consistent with the first version of the product recipe at each of the first batch runner and the second batch runner;

receiving a second version of the product recipe, wherein the second version of the product recipe differs from the first version of the product recipe in at least one of the plurality of actions or the plurality of parameters;

associating the first version of the recipe with a set of synchronization points each specifying a transition between two or more of the plurality of actions at which suspending the execution of the corresponding batch runner is allowed;

suspending the execution of the batch run at the first batch runner, wherein suspending the execution of the batch run at the first batch runner includes:

retrieving current state information of the first batch runner, wherein the current state specifies the one of the plurality of actions being executed by the batch runner or a transaction between two more of the plurality of actions; and comparing the current state information to the set of synchronization points to determine whether the second version of the recipe can be applied to the first batch runner at the current state of the batch runner;

applying the second version of the recipe to the first batch runner prior to the first runner completing the execution of the first version of the recipe;

resuming the execution of the batch run at the first batch runner according to the second version of the recipe;

completing the execution of the batch run at the first batch runner according to the second version of the recipe;

completing the execution of the batch run at the second batch runner according to the first version of the recipe;

receiving execution results from the first batch runner and the second batch runner; and selecting from among the first version and the second version based on the execution results.

2. The method of claim 1, wherein selecting from among the first version and the second version based on execution results includes:

generating a user report indicative of the execution results; and receiving a user selection indicative of a selection of the first version of the product recipe or the second version of the product recipe.

3. The method of claim 1, wherein selecting from among the first version and the second version based on execution results includes reverting to the first version of the product recipe at the first batch runner if the execution results associated with the first batch runner are unsatisfactory.

4. The method of claim 1, wherein suspending the execution of the batch run at the first batch runner includes suspending the execution of the batch run in response to receiving a user command.

5. The method of claim 1, wherein suspending the execution of the batch run at the first batch runner includes automatically suspending the execution of the batch run in response to detecting a predefined condition associated with the execution of the batch run.

6. The method of claim 1, further comprising validating the second version of the recipe by verifying recipe logic associated with the second version of the recipe prior to applying the second version of the recipe to the first batch runner.

7. The method of claim 1, wherein the process control equipment includes a plurality of field devices each performing at least one of a measurement or control function in within the process plant; wherein each of the first batch runner and the second batch runner communicates with at least one process controller connected to the plurality of field devices; and wherein initiating the respective batch run at each of the first batch runner and the second batch runner includes downloading a set of instructions corresponding to the first version of the recipe to the process controller.

* * * * *